United States Patent
O'Reilly (10) Patent No.: US 10,282,755 B2
(45) Date of Patent: May 7, 2019

(54) SYSTEMS, METHODS, AND MEDIA FOR MOBILE ADVERTISING CONVERSION ATTRIBUTION

(71) Applicant: Dstillery, Inc., New York, NY (US)

(72) Inventor: Thomas O'Reilly, Brooklyn, NY (US)

(73) Assignee: Dstillery, Inc., New York, NY (US)

( * ) Notice: Subject to any disclaimer, the term of this patent is extended or adjusted under 35 U.S.C. 154(b) by 0 days.

(21) Appl. No.: 15/412,810

(22) Filed: Jan. 23, 2017

(65) Prior Publication Data

US 2017/0200199 A1    Jul. 13, 2017

Related U.S. Application Data

(63) Continuation of application No. 14/043,610, filed on Oct. 1, 2013, now Pat. No. 9,552,590.

(60) Provisional application No. 61/708,558, filed on Oct. 1, 2012.

(51) Int. Cl.
*G06Q 30/00* (2012.01)
*G06Q 30/02* (2012.01)

(52) U.S. Cl.
CPC ..... *G06Q 30/0267* (2013.01); *G06Q 30/0246* (2013.01)

(58) Field of Classification Search
None
See application file for complete search history.

(56) References Cited

U.S. PATENT DOCUMENTS

| | | | |
|---|---|---|---|
| 4,264,906 A * | 4/1981 | Wakatake | G09F 9/375 345/111 |
| 5,431,288 A * | 7/1995 | Nishijima | B07C 3/00 209/584 |
| 5,532,753 A | 7/1996 | Buchner et al. | |
| 5,590,250 A | 12/1996 | Lamping et al. | |
| 5,615,325 A | 3/1997 | Peden | |
| 5,619,632 A | 4/1997 | Lamping et al. | |
| 5,675,510 A | 10/1997 | Coffey et al. | |
| 5,712,981 A | 1/1998 | McKee et al. | |
| 5,910,803 A | 6/1999 | Grau et al. | |
| 6,052,730 A | 4/2000 | Felciano et al. | |
| 6,470,383 B1 | 10/2002 | Leshem et al. | |
| 6,952,181 B2 | 10/2005 | Karr et al. | |
| 7,647,057 B2 | 1/2010 | Jamshidi | |
| 7,761,326 B2 | 7/2010 | Miyaoku et al. | |

(Continued)

*Primary Examiner* — Matthew T Sittner
(74) *Attorney, Agent, or Firm* — Cooley LLP (57) ABSTRACT

A method for mobile advertising conversion attribution can include receiving, for example, at a conversion tracking server, a signal from a user device indicating that a conversion tag has been received. The signal can include a segment identifier, and a user agent (UA) and/or an internet protocol (IP) address of the user device. A conversion identifier can be defined that is associated with the segment identifier, the UA, and/or the IP address. The conversion identifier can be stored in a first database along with an indication of when the conversion identifier was received. A second database can be searched for an advertisement identifier that matches the conversion identifier and was received within a predetermined period of time before the conversion identifier. If a match between the conversion identifier and an advertisement identifier is located, a signal indicating that an advertisement was converted can be sent to an advertiser.

18 Claims, 4 Drawing Sheets

(56) References Cited

U.S. PATENT DOCUMENTS

| | | |
|---|---|---|
| 8,001,005 B2 | 8/2011 | Pitkow et al. |
| 8,073,460 B1 | 12/2011 | Scofield et al. |
| 8,370,062 B1 | 2/2013 | Starenky et al. |
| 8,386,304 B2 | 2/2013 | Chen et al. |
| 8,386,311 B2 | 2/2013 | Park et al. |
| 8,438,062 B2 | 5/2013 | Rohan et al. |
| 8,453,190 B2 | 5/2013 | Liwerant et al. |
| 8,464,302 B1 | 6/2013 | Liwerant et al. |
| 8,548,851 B2 | 10/2013 | Chen et al. |
| 8,566,022 B1 | 10/2013 | Starenky et al. |
| 8,577,735 B2 | 11/2013 | Wilen et al. |
| 8,582,565 B1 | 11/2013 | Morsy et al. |
| 8,583,368 B1 | 11/2013 | Sindlinger et al. |
| 8,805,348 B2 | 8/2014 | Matsuoka |
| 8,855,922 B1 | 10/2014 | Starenky et al. |
| 9,552,590 B2* | 1/2017 | O'Reilly .......... G06Q 30/0267 |
| 9,633,365 B1* | 4/2017 | Pattan .............. G06Q 30/0241 |
| 2002/0078191 A1* | 6/2002 | Lorenz .................. H04L 29/06 709/223 |
| 2002/0169892 A1* | 11/2002 | Miyaoku .......... G06F 17/30876 709/246 |
| 2004/0203854 A1 | 10/2004 | Nowak |
| 2005/0136949 A1 | 6/2005 | Barnes, Jr. |
| 2005/0160002 A1* | 7/2005 | Roetter .................. G06Q 30/02 705/14.42 |
| 2005/0239477 A1 | 10/2005 | Kim et al. |
| 2006/0119508 A1 | 6/2006 | Miller |
| 2006/0167749 A1* | 7/2006 | Pitkow .................. G06Q 30/02 705/14.61 |
| 2006/0229942 A1* | 10/2006 | Miller .................. G06Q 30/02 705/14.46 |
| 2007/0133517 A1 | 6/2007 | Miller et al. |
| 2007/0157110 A1 | 7/2007 | Gandhi et al. |
| 2007/0157113 A1 | 7/2007 | Bishop et al. |
| 2007/0157114 A1* | 7/2007 | Bishop .................. H04L 67/36 715/787 |
| 2008/0059620 A1* | 3/2008 | Claise .............. H04L 41/0213 709/223 |
| 2008/0065474 A1* | 3/2008 | Sharma .................. G06Q 30/02 705/12 |
| 2008/0103971 A1* | 5/2008 | Lukose .................. G06Q 20/10 705/40 |
| 2008/0114649 A1* | 5/2008 | Swirsky .................. G06Q 30/02 705/14.64 |
| 2008/0172478 A1 | 7/2008 | Kiyohara et al. |
| 2008/0255904 A1* | 10/2008 | Park .................. G06Q 30/02 705/14.45 |
| 2008/0300983 A1* | 12/2008 | Chen .................. G06Q 20/102 705/14.46 |
| 2009/0012760 A1 | 1/2009 | Shunemann |
| 2009/0023456 A1 | 1/2009 | Seacat et al. |
| 2009/0070706 A1* | 3/2009 | Ranganath .......... G06Q 30/02 715/787 |
| 2009/0187479 A1* | 7/2009 | Hartline .............. G06Q 30/02 705/14.54 |
| 2009/0254954 A1* | 10/2009 | Jeong .................. G06Q 30/00 725/105 |
| 2009/0327070 A1* | 12/2009 | Etchegoyen ...... G06F 17/30867 705/14.45 |
| 2010/0017278 A1 | 1/2010 | Wilen et al. |
| 2010/0057832 A1 | 3/2010 | Tsun et al. |
| 2010/0094704 A1* | 4/2010 | Subramanian ......... G06Q 30/02 705/14.45 |
| 2010/0106598 A1* | 4/2010 | Grimes .................. G06Q 30/02 705/14.53 |
| 2010/0106606 A1* | 4/2010 | Filice .................. G06Q 30/02 705/14.73 |
| 2010/0246405 A1 | 9/2010 | Potkonjak |
| 2011/0055009 A1* | 3/2011 | Kiveris .............. G06F 17/30867 705/14.52 |
| 2011/0138326 A1* | 6/2011 | Roberts .................. G06Q 30/02 715/808 |
| 2011/0191714 A1 | 8/2011 | Ting et al. |
| 2011/0246267 A1* | 10/2011 | Williams ............... G06Q 30/02 705/14.4 |
| 2011/0246297 A1 | 10/2011 | Buchalter et al. |
| 2011/0246298 A1 | 10/2011 | Williams et al. |
| 2011/0270673 A1 | 11/2011 | Lin et al. |
| 2011/0270674 A1* | 11/2011 | Cosman ............. G06Q 30/0254 705/14.45 |
| 2011/0288916 A1 | 11/2011 | Pitkow et al. |
| 2011/0295680 A1* | 12/2011 | Shaw .................. G06Q 30/02 705/14.44 |
| 2011/0302025 A1 | 12/2011 | Hsiao et al. |
| 2011/0307320 A1 | 12/2011 | Tangney et al. |
| 2011/0307321 A1 | 12/2011 | Tangney et al. |
| 2011/0307322 A1 | 12/2011 | Hsiao et al. |
| 2011/0307324 A1 | 12/2011 | Hsiao et al. |
| 2011/0307325 A1 | 12/2011 | Hsiao et al. |
| 2011/0307326 A1 | 12/2011 | Hsiao et al. |
| 2011/0307330 A1 | 12/2011 | Hsiao et al. |
| 2011/0307385 A1* | 12/2011 | St. Pierre ............... G06Q 30/00 705/52 |
| 2011/0307509 A1 | 12/2011 | Hsiao et al. |
| 2011/0307515 A1 | 12/2011 | Chen et al. |
| 2012/0010927 A1 | 1/2012 | Attenberg et al. |
| 2012/0072280 A1* | 3/2012 | Lin ..................... G06Q 30/00 705/14.45 |
| 2012/0078708 A1* | 3/2012 | Taylor ............... G06Q 30/0242 705/14.41 |
| 2012/0116873 A1* | 5/2012 | Damm .................. G06Q 30/02 705/14.49 |
| 2012/0149388 A1 | 6/2012 | West et al. |
| 2012/0150629 A1* | 6/2012 | Ramer ............... G06Q 30/0247 705/14.46 |
| 2012/0166272 A1 | 6/2012 | Wiley et al. |
| 2012/0265599 A1 | 10/2012 | Corner et al. |
| 2012/0265603 A1* | 10/2012 | Corner .................. H04W 4/21 705/14.39 |
| 2012/0275524 A1 | 11/2012 | Lien et al. |
| 2012/0302256 A1 | 11/2012 | Pai et al. |
| 2012/0303447 A1 | 11/2012 | Hughes et al. |
| 2012/0308005 A1* | 12/2012 | Garcia ............... H04L 63/0485 380/255 |
| 2012/0310736 A1 | 12/2012 | Vengroff et al. |
| 2012/0330950 A1* | 12/2012 | Pichumani .......... H04L 65/4076 707/736 |
| 2013/0085841 A1 | 4/2013 | Singleton et al. |
| 2013/0085868 A1 | 4/2013 | Jordan et al. |
| 2013/0104175 A1* | 4/2013 | Applegate ............ H04N 21/231 725/87 |
| 2013/0166376 A1 | 6/2013 | Cohen et al. |
| 2013/0173358 A1 | 7/2013 | Pinkus |
| 2013/0173382 A1 | 7/2013 | Hasson et al. |
| 2013/0203440 A1 | 8/2013 | Bilange et al. |
| 2013/0231977 A1 | 9/2013 | Synett et al. |
| 2013/0346199 A1* | 12/2013 | Brook ................. G06Q 30/0255 705/14.53 |
| 2014/0019230 A1* | 1/2014 | Lawson .................. G06Q 30/02 705/14.45 |
| 2014/0025502 A1 | 1/2014 | Ramer et al. |
| 2014/0032326 A1* | 1/2014 | Li ..................... G06Q 30/0266 705/14.58 |
| 2014/0068773 A1 | 3/2014 | Stitelman et al. |
| 2014/0089349 A1 | 3/2014 | Mercier et al. |
| 2014/0095297 A1* | 4/2014 | O'Reilly ............ G06Q 30/0267 705/14.45 |
| 2014/0237595 A1 | 8/2014 | Sridhara et al. |
| 2014/0349671 A1 | 11/2014 | Lakhzouri et al. |
| 2015/0154632 A1* | 6/2015 | Jindal ................. G06Q 30/0246 705/14.45 |
| 2017/0200199 A1* | 7/2017 | O'Reilly ............ G06Q 30/0267 |

\* cited by examiner

SYSTEMS, METHODS, AND MEDIA FOR MOBILE ADVERTISING CONVERSION ATTRIBUTION

CROSS REFERENCE TO RELATED APPLICATIONS

This application is a continuation of and claims priority to U.S. patent application Ser. No. 14/043,610, now U.S. Pat. No. 9,552,590, filed Oct. 1, 2013, which is a nonprovisional of U.S. Patent Application No. 61/708,558, filed Oct. 1, 2012, each entitled "Systems, Methods, and Media for Mobile Advertising Conversion Attribution," and each of which is incorporated herein by reference its entirety.

BACKGROUND

Some embodiments described herein relate to determining whether an advertisement served to a mobile device is converted.

An advertisement is converted when a user who views the advertisement takes some action desired by the advertiser, such as, for example, purchasing a product, service, or subscription featured in the advertisement, or engaging in additional research of the product of service, such as visiting the advertisers website or any other action indicative of user engagement with the advertisement. In most cases, the purpose of an advertising campaign is to increase sales by driving consumers to the product. Hence, whether an advertisement is converted is typically a key measure of success of the advertising campaign.

Historically, evaluating the success of an advertising campaign has been extremely difficult. With the development of Internet advertising and techniques such as the tracking cookie, merchants were finally able to collect reliable metrics on an ad-by-ad basis. This influx of data allowed merchants to count each time a user interacted with their ads, and even each time a consumer made a purchase after viewing an advertisement. For the first time, merchants were able to pay only when an advertising impression was converted.

When an advertisement is viewed on a mobile device, however, conversing tracking techniques that were developed for desktop computers may not be adequate. For example, many mobile devices, such as the Apple iPhone® restrict the ability of advertisers to set cookies associated with mobile browsers. Furthermore, the cookie model, which was developed for traditional desktop web browsers, often does not translate to mobile applications, because such mobile applications may not be able to store cookies.

A need therefore exists for systems, methods, and media for mobile advertising conversion attribution.

SUMMARY

A method for mobile advertising conversion attribution can include receiving, for example, at a conversion tracking server, a signal from a user device indicating that a conversion tag has been received. The signal can include a segment identifier, and a user agent (UA) and/or an internet protocol (IP) address of the user device. A conversion identifier can be defined that is associated with the segment identifier, the UA, and/or the IP address. The conversion identifier can be stored in a first database along with an indication of when the conversion identifier was received. A second database can be searched for an advertisement identifier that matches the conversion identifier and was received within a predetermined period of time before the conversion identifier. If a match between the conversion identifier and an advertisement identifier is located, a signal indicating that an advertisement was converted can be sent to an advertiser.

DETAILED DESCRIPTION

In some embodiments described herein, a conversion tracking server is operable to storing an association between an advertisement and a user device that receives the advertisement. For example, when an advertisement is received by the user device, the conversion tracking server can receive a segment identifier associated with the advertisement and information associated with the user device, such as a user agent string (also referred to herein as simply a "user agent" or UA) and/or an internet protocol (IP) address. The IP address can be operable to identify how and/or where the user device connects to the internet. The UA can provide information about the type of the user device, such as what operating system the device is running, what program requested the advertisement, the manufacturer of the user device, the model of the user device, and other information associated with the user device. Collectively, the IP address and the UA can semi-uniquely identify the user device.

Similarly, the conversion tracking server can be operable to store an association between a conversion event and the user device. For example, when the user device makes a purchase (or is used for any other suitable conversion action) the conversion tracking server can receive a segment identifier, the IP address, and the UA. In an instance where the segment identifier, the IP address, and the UA associated with the conversion event match the segment identifier, the IP address, and the UA associated with the advertisement, the conversion tracking server can be operable to identify an advertising conversion.

In one embodiment, a method of tracking an advertising conversion can include receiving an indication of receipt of a conversion tag by a user device. The indication of receipt of the conversion tag can include a segment identifier, a user agent string, and/or an IP address of the user device. A conversion identifier can be defined that is associated with the segment identifier, the UA, and/or the IP address. The conversion identifier can be stored in a conversion database and can be associated with an event time, which can be, for example, the time the conversion tag was received by the user device or the time the indication of receipt of the conversion tag was received. A convertible database can be searched for an advertisement identifier that is associated with an advertisement time that occurs within a predetermined period of time before the event time. If a match is identified, it can be indicative of an advertising conversion, and a signal can be sent to an advertiser, for example, to report the successful conversion.

In another embodiment, a method of identifying an advertising conversion can include generating an advertisement tag configured to be received by a user device. An indication that the advertisement tag was received can include an IP address and/or a UA. The UA and/or the IP address can be stored in a convertible database along with an indication of when the advertisement tag was received by the user device or the when the indication of receipt of the advertisement tag was received. The method can further include receiving an indication that a conversion tag was received including the UA and/or the IP address. The UA and/or the IP address can be stored in a conversion database along with an indication of when the conversion tag was received by the user device or the when the indication of receipt of the conversion tag was received. A conversion event can be identified based on a comparison of the entry in the convertible database with the entry of the conversion database.

In yet another embodiment, a method of identifying an advertising conversion can include receiving an advertisement tag including a first segment identifier. In response to receiving the advertisement tag, the first segment identifier, a UA, and/or an IP address can be sent to a compute device. Sending the first segment identifier, the UA, and/or the IP address can cause the compute device to define an advertisement identifier associated with the first segment identifier, the user agent, and/or the IP address. A conversion tag, which can include a second segment identifier, can be received. In response to receiving the conversion tag, the second segment identifier, the UA, and/or the IP address can be sent to the compute device. Sending the second segment identifier, the UA, and/or the IP address can cause the compute device to define a conversion identifier associated with the second segment identifier, the UA, and/or the IP address. A conversion can be identified based on a match of the conversion identifier to the advertisement, causing the compute device to send a signal that the conversion occurred.

As used herein, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "an optical transceiver system" is intended to mean a single optical transceiver system or multiple optical transceiver systems.

Figure 1:
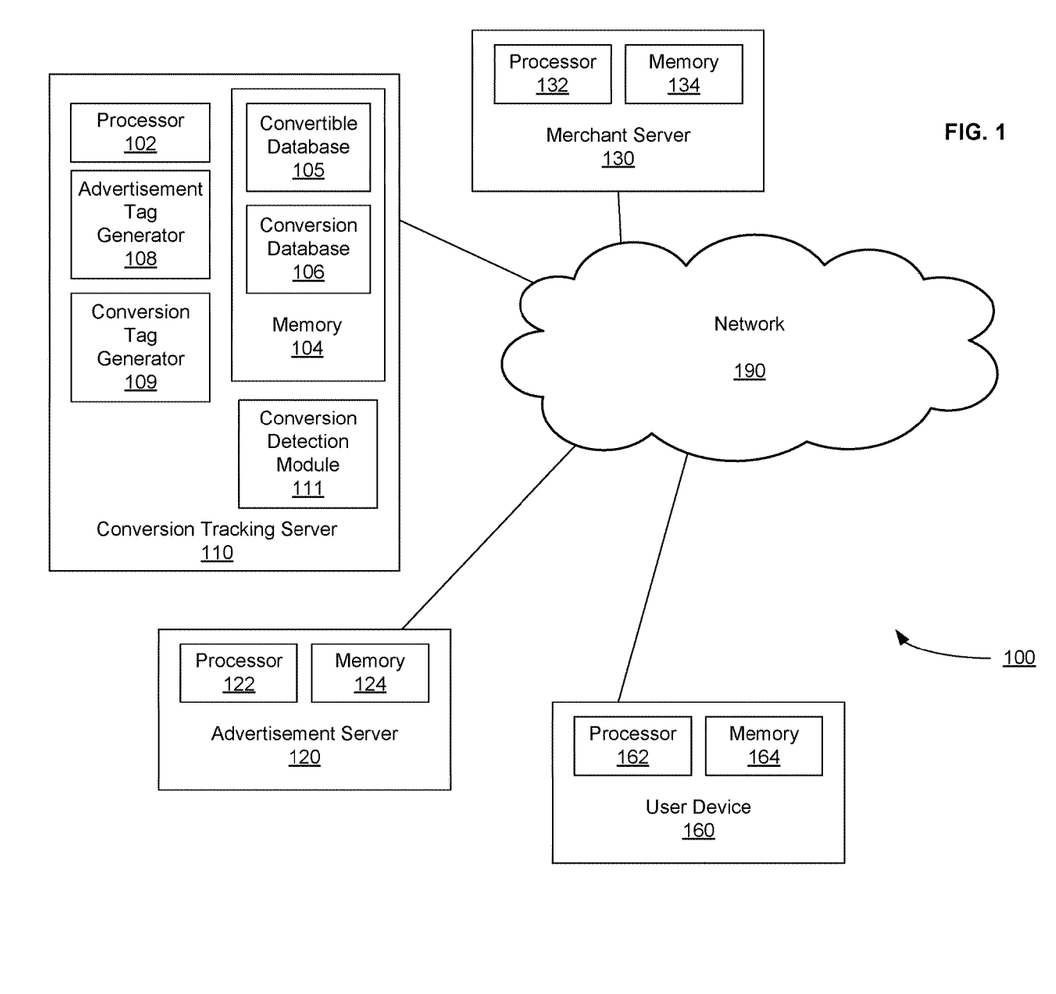
FIG. 1 is a schematic diagram of a system for mobile advertisement conversion attribution, according to an embodiment.

FIG. 1 is a schematic diagram of a system 100 for mobile advertisement conversion attribution, according to an embodiment. The system 100 includes a conversion tracking server 110, an advertisement server 120, a merchant server 130, and a user device 160, each communicatively coupled via a network 190.

The user device 160 can be a mobile computing entity, such as a smartphone (e.g., an iPhone®, an Android® device, a Windows® phone, a Blackberry® phone, etc.) or a tablet computer (e.g., an Apple iPad®, a Samsung Nexus® device, a Microsoft Surface® device, etc.). The user device 160 includes a processor 162, and a memory 164. The processor 162 can be, for example, a general purpose processor, a Field Programmable Gate Array (FPGA), an Application Specific Integrated Circuit (ASIC), a Digital Signal Processor (DSP), and/or the like. The processor 162 can be configured to retrieve data from and/or write data to memory, e.g., the memory 164, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

The user device 160 can be operable to display advertising content to a user. For example, as described in further detail herein, a web browser or other application (executing on the processor 162) can cause the user device 160 to request advertising content, for example, from the advertising server 120. In response, the user device 160 can receive and display the advertisement.

The merchant server 130 can be a computing entity operable to store, generate and/or send advertisements to the user device 160. The merchant server 130 includes a processor 132 and a memory 134, which can be functionally similar to the processor 162 and the memory 164, respectively.

The merchant server 130 can be a web host operable to store (e.g., in the memory 134) and send web content to the user device 160. For example, when a user directs a browser of the user device 160 to an address (e.g. a uniform resource locator (URL)) associated with the merchant server 130, the merchant server can transmit code (e.g., hypertext markup language (HTML)) operable to cause the user device to display the web content.

The advertisement server 120 can be a computing entity operable to store, generate, and/or send advertisements to the user device 160. The advertisement server 120 includes a processor 122 and a memory 124, which can be functionally similar to the processor 162 and the memory 164, respectively.

In some embodiments, the advertisement server 120 is an advertising host, operable to store advertising content (e.g., in the memory 124) and send advertising content to the user device 160. In other embodiments, the advertisement server is a component of an advertising exchange network (not shown in FIG. 1) operable to match advertisers with users, for example, through real time bidding.

As described in further detail herein, the advertisement server 120 can be operable to receive an advertisement tag from the conversion tracking server 110, embed the advertisement tag in an advertisement, and/or send the advertisement containing the advertisement tag to the user device 160.

The conversion tracking server 110 can be a computing entity operable to associate advertising impressions with a later occurring conversion event, as described in further detail herein. The conversion server includes a processor 102, a memory 104, an advertisement tag generator 108, a conversion tag generator 109, and a conversion detection module 111. The processor 102 and the memory 104 can be functionally similar to the processor 162 and the memory 164, respectively.

The advertisement tag generator 108 can be a module (e.g., a hardware component and/or a module of software code stored in memory 104 and/or executed on the processor 102) operable to identify an advertisement and/or generate an advertisement tag. In some embodiment, as described in further detail herein, the advertisement tag generator 108 can define a segment identifier associated with the advertisement. The advertisement tag can be a portion of software code that can be embedded in the advertisement and is referred to herein as an "advertisement tag" or "advertisement pixel."

The advertisement tag can be executed on the processor 162 of the user device 160 when the user device 160 receives the advertisement. The advertisement tag executing can be referred to as the advertisement tag "firing." When the advertisement tag fires, it can cause the user device 160 to send an indication of receipt of the advertisement tag to the conversion tracking server 110. The indication of receipt can include the segment identifier, an indication of the time when the advertisement tag fired, a UA string associated with the user device 160, and/or an IP address associated with the user device 160. The conversion tracking server 110 can be operable to store the indication of receipt of the advertisement tag in a convertible database 105 in the memory 104.

The conversion tag generator 109 can be a module (e.g., a hardware component or a portion of software code stored in memory 104 and/or executed on the processor 102) operable to generate a conversion tag. The conversion tag can be associated with a conversion action, such as making a purchase, visiting a webpage (e.g., requesting a resource from the merchant server 130), registering for a service and/or subscription, using a coupon, and/or any other suitable action that an advertiser might desire an advertising impression to result in. The conversion tag can otherwise be functionally similar to the advertisement tag. For example, the conversion tag generator 109 can be operable to generate a portion of software code that can be embedded in a webpage, such as a confirmation webpage that is transmitted from the merchant server 130 to the user device 160 after the user device 160 completes a purchase. Such a portion of code is referred to herein as a "conversion tag" or "conversion pixel."

For example, as described in further detail herein, the conversion tag, when received by the user device 160, can be executed ("fire") (on the processor 162) to cause the user device 160 to send an indication of receipt of the conversion tag to the conversion tracking server 110. The indication of receipt of the conversion tag can include the segment identifier, the time the conversion tag was received, a UA associated with the user device 160, and/or an IP address associated with the user device 160. The conversion tracking server 110 can be operable to store the indication of receipt of the conversion tag in a conversion database 106 in the memory 104.

The network 190 can be the Internet, an intranet, a local area network (LAN), a wide area network (WAN), a virtual network, a telecommunications network, any other suitable communication system and/or combination of such networks. The network 190 can be implemented as a wired and/or wireless network.

Figure 2:
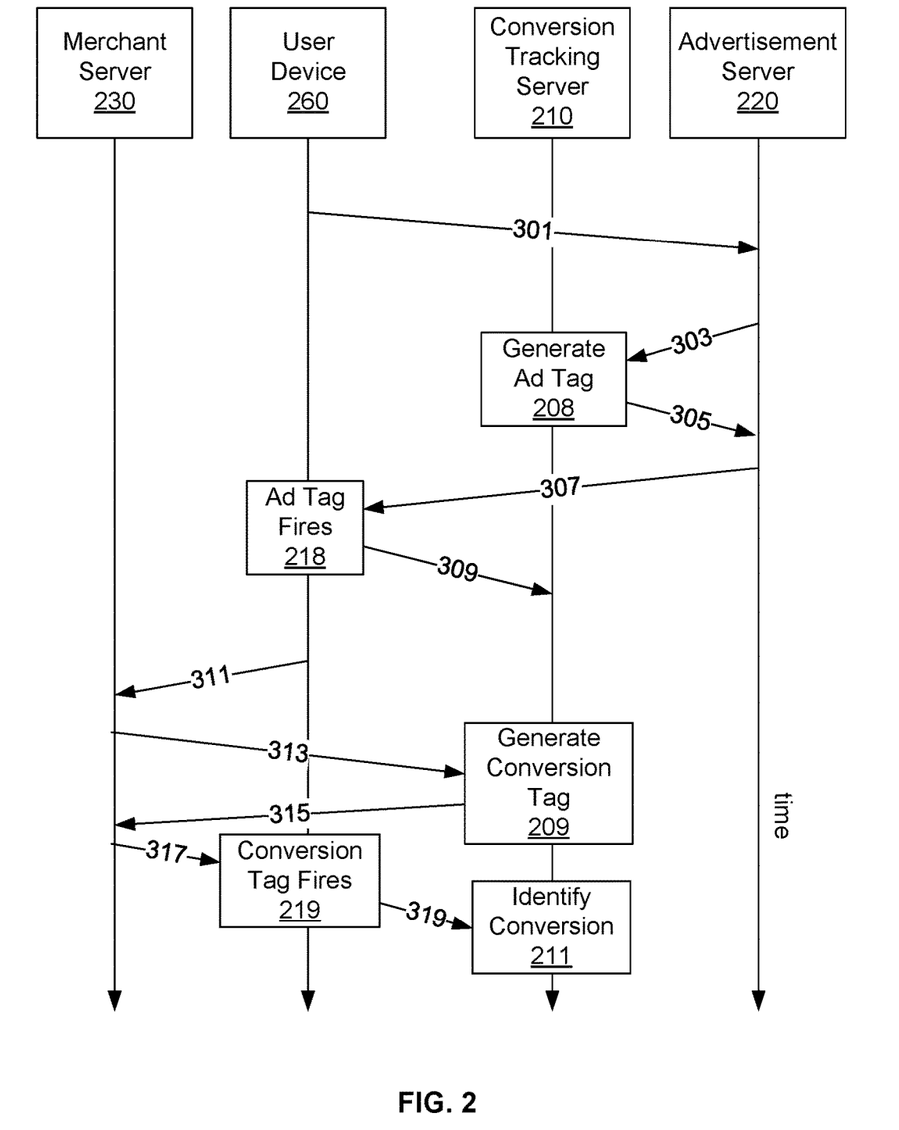
FIG. 2 is a signal diagram for mobile advertisement conversion attribution, according to an embodiment.

FIG. 2 is a signal diagram for mobile conversion attribution, according to an embodiment. FIG. 2 illustrates communication between a conversion tracking server 210, an advertisement server 220, a merchant server 230, and a user device 260. The conversion tracking server 210, the advertisement server 220, the merchant server 230, and/or the user device 260 can be structurally and/or functionally similar to the conversion tracking server 110, the advertisement server 120, the merchant, server 130, and/or the user device 160, respectively, as shown and described with reference to FIG. 1.

The user device 260 can send a signal 301 to the advertisement server 220. Signal 301 can be a request for advertising content. Signal 301 can be generated by the user device 260, for example, in response to retrieving a web page from a web server (not shown) containing instructions to request advertising content from the advertisement server 220 and/or in response to an application (executing on a processor of the user device) requesting advertising content from the advertisement server 220. The advertisement server 220, upon receiving signal 301 can send signal 303 to the conversion tracking server 210. Signal 303 can include a request for an advertisement tag. Signal 303 can include information about the advertisement, such as information about the advertiser, the product, the product category, and/or any other suitable information.

After receiving signal 303, the conversion tracking server 210 can generate an advertisement tag, at 208. Generating the advertisement tag, at 208, can include defining a first segment identifier based, for example, on information about the advertisement contained in signal 303. For example, in some embodiments, the first segment identifier is associated with at least one of the advertiser, the product, a product category, an advertising campaign, and/or any other suitable feature of the advertisement. As an illustration, when signal 303 contains an indication that the advertisement is for product A, the conversion tracking server 210 can generate segment identifier X, at 208. If, on the other hand, signal 303 contains an indication that the advertisement is for product B, the conversion tracking server 210 can generate segment identifier Y, at 208.

Generating the advertisement tag, at 208, can further include configuring the advertisement tag to cause the user device 260 to send the first segment identifier, and/or data associated with the user device 260 to the conversion tracking server 210 (e.g., signal 309, as described in further detail herein) upon receiving the advertisement tag. For example, the advertisement tag can be a portion of code configured to cause the user device 260 to send the first segment identifier and/or data associated with the user device 260 to the conversion tracking server 210 when the advertisement tag executes on the processor of the user device 260.

The conversion tracking server 210 can send the advertisement tag to the advertisement server 220, as shown as signal 305. The advertisement server 220 can embed the advertisement tag in the advertisement. Similarly stated, the advertisement server 220 can include code generated by the conversion tracking server 210, at 208, with code associated with the advertisement requested in signal 301.

The advertisement server 220 can then send, to the user device 260, the advertisement, including the advertisement tag, as shown as signal 307. When signal 307 is received by the user device 260, the advertisement can be displayed and the advertisement tag can fire, at 218. When the advertisement tag fires, at 218, the advertisement tag can cause the user device 260 to send signal 309 to the conversion tracking server 210. Signal 309 can include the first segment identifier and/or the time the advertisement tag fired. Signal 309 can further include data associated with the user device 260. For example, signal 309 can include data that uniquely identifies the user device 260, such as a unique device identifier (UDID), media access control (MAC) address, electronic serial number (ESN), and/or other substantially unique and/or substantially immutable identifier. In addition or alternatively, signal 309 can include data associated with the user device 260 and that may not be unique or immutable, such as an internet protocol (IP) address, and/or UA.

Having received signal 309, the conversion tracking server 210 can define an association between the first segment identifier (received in signal 309) and data associated with the user device 260 (e.g., in the convertible database 105, as described above with reference to FIG. 1). In this way, the conversion tracking server 210 can operably define an association between the first segment identifier and the user device 260. Because the first segment identifier can itself associated with the advertisement, the conversion tracking server 210 can thus be operable to define a record that the user device 260 received the advertisement (as shown as signal 307).

The user device 260 can send a signal 311 to the merchant server 230. In some embodiments, signal 311 is independent of signals 301 and/or 309. For example, a web browser (executing on a processor of the user device 260) can cause the user device 260 to send signal 301 requesting an advertisement during a first browsing session. After concluding the first browsing session, the user can initiate a second browsing session in which the user directs the web browser to the merchant server 230 causing the user device 260 to send signal 311. As another example, the user can cause the user device 260 to execute a mobile application that causes the user device 260 to send signal 301 requesting advertising content. The user can later close the application, access a web browser, and direct the web browser to the merchant server 230 (signal 311).

In some embodiments, the user device 260 may not be operable to store an HTML cookie when the advertisement is received in signal 307. For example, if the advertisement is presented in a mobile application, cookies may not be enabled. Similarly, some mobile operating systems do not allow mobile web browsers to store cookies. Accordingly, the user device 260 may not be operable to store and/or transmit an identifier that can be used to determine if the user device 260 receives an advertisement and is later used for a conversion action.

In some embodiments, signal 311 can be associated with a conversion event. For example, signal 311 can be associated with a purchase from the merchant server 230 of a product featured in the advertisement delivered by the advertisement server 220 (signal 307). In such an example, signal 311 can be associated with a "confirmation page" requested by the user device 260 after completion of a purchase. As another example, signal 311 can be associated with requesting the front page associated with the merchant server 230 and/or any other information from the merchant server 230.

After receiving signal 311, the merchant server can send signal 313 to the conversion tracking server 210. Signal 313 can include a request for a conversion tag and information about signal 311. For example, signal 313 can include an indication of the resource (e.g., the URL) requested by the user device 260 in signal 311. In an instance where signal 311 is associated with the purchase of a product, signal 313 can include an indication of the purchased product. In another instance, signal 311 can include any other suitable indication of a conversion event, such as an indication that a digital coupon was used, an indication that the user device 260 was used to sign up for a subscription, etc.

The conversion tracking server 210 can receive signal 313 and can generate a conversion tag, at 209. Generating the conversion tag, at 209, can include defining a second segment identifier based on information received in signal 313. For example, in some embodiments, the segment identifier is associated with at least one of the merchant, the product, or product category associated with signal 311. As an illustration, when signal 311 is associated with the purchase of product A, the conversion tracking server 210 can generate segment identifier X, at 209. If, on the other hand, signal 311 is associated with the purchase of product B, the conversion tracking server 210 can generate segment identifier Y, at 209.

Thus, defining the first segment identifier, at 208, and generating the second segment identifier, at 209, can collectively assign the same segment identifier, for example, if signal 311 represents a purchase of the product featured in the advertisement of signal 307. In this way, the segment identifier can be analogous to an classifier operable to identify related actions (e.g., an advertisement for merchant D is related to a visit to merchant D's website and may be assigned the same segment identifier). Furthermore, defining the first and second segment identifiers at 208 and 209, respectively, can occur independently. Similarly stated, the conversion tracking server 210 may not require any information about the advertisement tag generated at 208, the advertisement server 220, or signal 301, 303, 305, 307, or 309 to generate the conversion tag, at 209.

Generating the conversion tag, at 209, can further include configuring the conversion tag to cause the user device 260 to send the second segment identifier and/or data associated with the user device 260 to the conversion tracking server 210 (e.g., signal 319, as described in further detail herein) upon receiving the conversion tag. For example, the conversion tag can be a portion of software code configured to cause the user device 260 to send the second segment identifier and/or data associated with the user device 260 to the conversion tracking server 210 when the conversion tag executes on the processor of the user device 260.

The conversion tracking server 210 can send the conversion tag to the merchant server 230, as shown as signal 315. The merchant server 230 can embed the conversion tag in content to be transmitted to the user device 260. Similarly stated, the merchant server 230 can include code generated by the conversion tracking server, at 209, with code associated with the request for content received in signal 311.

The merchant server 230 can then send, to the user device 260, the content requested in signal 311, including the conversion tag, as shown as signal 317. When signal 317 is received by the user device 260, the content can be displayed, and the conversion tag can fire, at 219. When the conversion tag fires, at 219, the conversion tag can cause the user device 260 to send signal 319 to the conversion tracking server 210. Signal 319 can include the second segment identifier and/or the time the conversion tag fired. Signal 319 can further include data associated with the user device 260, such as the UDID, MAC address, ESN, IP address, and/or UA string.

Having received signal 319, the conversion tracking server 210 can define an association between the second segment identifier (received in signal 319) and data associated with the user device 260 (e.g., in the conversion database 106, as described above with reference to FIG. 1). In this way, the conversion tracking server 210 can be operable define an association between the second segment identifier and the user device 210. Because the second segment identifier can itself be associated with content requested from the merchant server 230, the conversion tracking server 210 can thus be operable to define a record that the user device 260 received content from the merchant server 230 (as shown as signal 317).

The conversion tracking server 210 can identify a conversion event, at 211. As described in further detail herein, identifying a conversion event can include determining whether an advertisement tag fired (at 218), matching the second segment identifier (received with signal 319) to the first segment identifier (received with signal 309), matching the device that sent signal 319 to the device that sent signal 309, and/or determining that signal 309 was received within a predetermined period of time (e.g., within 24 hours) of signal 319.

Although not shown in FIG. 2, if the conversion tracking server 210 identifies a conversion at 211, the conversion tracking server 210 can notify the advertisement server 220, the merchant server 230, and/or any other suitable device, for example, so that the advertiser can be properly billed for the converted advertisement. Similarly stated, the conversion tracking server 210 can generate a report that can be used to account for a successful advertising conversion.

Figure 3A:
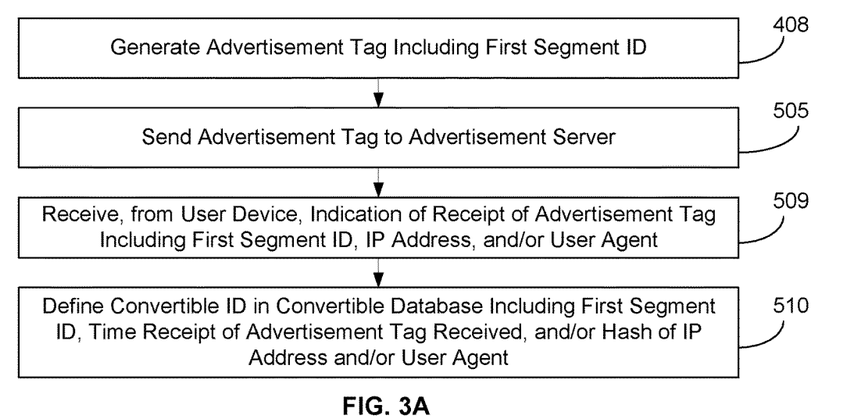
FIGS. 3A and 3B are aspects of a method for mobile advertisement conversion attribution, according to an embodiment.
Figure 3B:
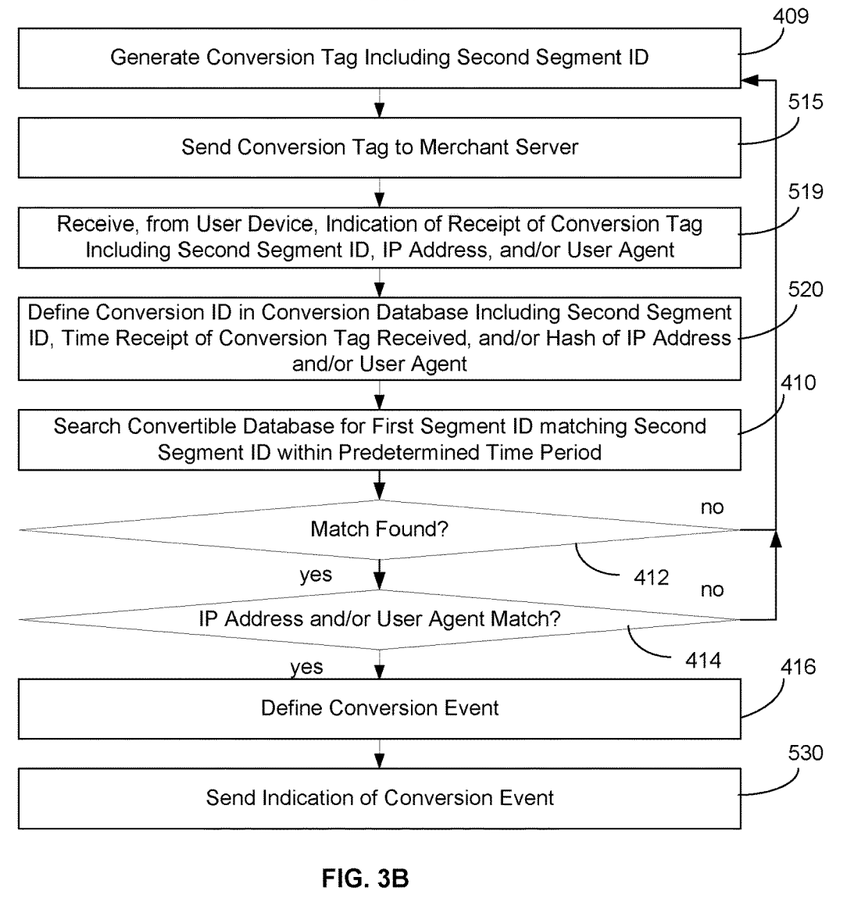

FIGS. 3A and 3B are aspects of a method for mobile advertisement conversion attribution. In some embodiments, the methods illustrated in FIGS. 3A and 3B are executed at a conversion tracking device (e.g., the conversion tracking device 110 shown and described with reference to FIG. 1). More particularly, the method can be implemented as code stored within a memory (e.g., the memory 104) of the conversion tracking device and executed on a processor (e.g., the processor 102).

FIG. 3A depicts aspects of mobile conversion attribution associated with an advertisement tag. At 408, the method can include generating an advertisement tag, which can include a first segment identifier. Generating the advertisement tag, at 408 can be similar to generating the advertisement tag, at 208, as shown and described above with reference to FIG. 2. The advertisement tag can be sent to an advertisement server, at 505, which can be similar to signal 305 sent to advertising server 220.

At 509, an indication of receipt of the advertisement tag can be received, for example, from a user device (e.g., the user device 260). The indication of receipt received, at 509 can be similar to signal 309. For example, the indication of receipt received, at 509 can include the first segment identifier, an indication of the time the advertisement tag fired, an IP address and/or a UA associated with a user device. In response to receiving the indication of receipt of the advertisement tag at 509, an entry can be made into a database (e.g., the convertible database 105), at 510. The database entry is referred to herein as a "convertible identifier," and can include and/or associate the first segment identifier with the time the advertisement tag fired, the time the indication of receipt of the advertisement tag was received at 509, the IP address, and/or the UA.

In some embodiments, the IP address and/or the UA can be hashed (collectively or individually) using, for example, a one-way irreversible hash function before the convertible identifier is defined. In this way, the convertible database does not include sensitive personal data, such as an IP address. In other embodiments, the IP addresses and/or UA may not be hashed.

Thus, the convertible identifier can be a database entry and/or an association between the first segment identifier, the time of firing of the advertisement tag, and an indication (e.g., IP address and/or UA) associated with the user device. In other embodiments, any other suitable data or metadata that can uniquely or semi-uniquely identify the user device can be stored in the convertible database instead of or in addition to the IP address and/or UA.

FIG. 3B depicts aspects of mobile conversion attribution associated with a conversion tag. At 409, the method can include generating a conversion tag, which can include a second segment identifier. Generating the conversion tag, at 409 can be similar to generating the conversion tag, at 209, as shown and described above with reference to FIG. 2. The conversion tag can be sent to an merchant server, at 515, which can be similar to signal 315 sent to merchant server 230.

At 519, an indication of receipt of the conversion tag can be received, for example, from a user device (e.g., the user device 260). The indication of receipt received, at 519 can be similar to signal 319. For example, the indication of receipt received, at 519 can include the second segment identifier, the time the advertisement tag fired, the time the indication of receipt of the conversion tag was received at 519, an IP address and/or a UA associated with a user device. The combination of the IP address and the UA can define a semi-unique identifier for the device. Similarly stated, if two signals are received identifying the same IP address and UA (e.g., at 509 and 519), it can be concluded with a high degree of confidence that those signals were sent from the same device. For example, the degree of confidence can be sufficient for purposes of mobile advertisement conversion attribution.

In response to receiving the indication of receipt of the conversion tag, at 519, an entry can be made into a database (e.g., the conversion database 106), at 520. The database entry is referred to herein as a "conversion identifier," and can include and/or associate the second segment identifier with the time the conversion tag fired, the time the indication of receipt of the conversion tag was received, at 519, the IP address and/or the UA. As described above with reference to defining the convertible identifier at 510, in some embodiments, the IP address and/or the UA address can be hashed before the conversion identifier defined, at 520. Thus, the conversion identifier can be a database entry and/or an association between the first segment identifier, the time of firing of the advertisement tag, and a semi-unique identifier of the user device.

The conversion identifier can be compared to entries within the convertible database to determine whether a conversion occurred. For example, at 410, the convertible database can be searched to determine whether a convertible identifier includes the second segment identifier. For example, a determination can be made, at 410, as to whether the first segment identifier, defined at 408, is the same as the second segment identifier defined at 409. As described above with reference to FIGS. 2 and 209, if a segment identifier associated with the convertible identifier is the same as a segment identifier associated with a conversion identifier, this indicates the conversion identifier and the convertible identifier are associated with, for example, the same product, same merchant, same advertiser, same product category, and/or any other relationship that can be indicative of a conversion action.

In some embodiments, the convertible database can be searched, at 410, only for convertible identifiers that have a time stamp (e.g., associated with an advertisement tag firing) within a predetermined period of the time received, at 519. For example, an advertiser interested in determining whether an advertisement results in a purchase may only be interested in purchases made within 24 hours of the user viewing an advertisement. Accordingly, in some embodiments, the convertible database is searched, at 410, only for convertible identifiers having a time stamp less than 24 hours before the indication of time received at 519. In other embodiments, the predetermined period of time can be any suitable period of time, such as, for example 5 minutes, 1 hour, 12 hours, 48 hours, 1 week, etc.

At 412, the method can determine whether a convertible identifier matches the second segment identifier. If no match is found at 412, the method can restart and a new conversion tag can be generated, at 409, for example, when a merchant server requests a conversion tag. If, however, a match between the conversion identifier defined at 520 and a convertible identifier is identified, at 412, the method can determine whether the semi-unique device identifier of the conversion identifier matches the semi-unique device identifier of the convertible identifier, at 414. For example, the method can include determining whether the IP address, the UA, and/or a hash of the IP address and/or the UA of the conversion identifier matches a similar identifier of the convertible identifier. If no match is found at 414, the method can restart and return to 409. If, however, a match is identified, at 414, the method can define a conversion event, at 416. Similarly stated, if the segment identifier and semi-unique device identifier of the conversion identifier matches a segment identifier and semi-unique device identifier of a convertible identifier, this can be an indication that the user of the device has engaged in a conversion action such as purchasing a product featured in an advertisement.

An indication of the conversion can then be sent, at 530, to, for example, an advertiser, which can, for example, allow advertiser can properly bill the merchant for an advertisement that drove a sale, provide statistics regarding advertisement success to the advertiser, the merchant, and/or any other suitable party.

Figure 4A:
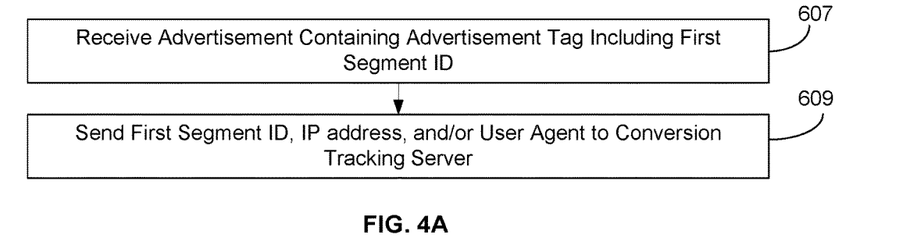
FIGS. 4A and 4B are aspects of a method communicating with a conversion tracking server for mobile conversion attribution, according to an embodiment.
Figure 4B:
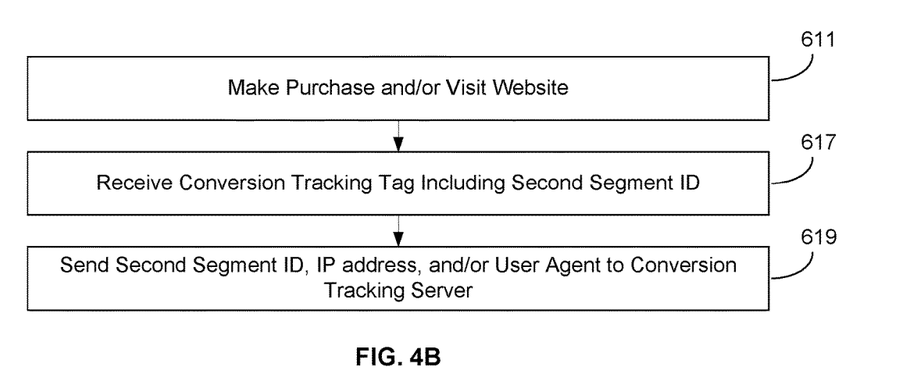

FIGS. 4A and 4B are aspects of a method for communicating with a conversion tracking server for mobile conversion attribution, according to an embodiment. In some embodiments, the methods illustrated in FIGS. 4A and 4B are executed at a user device (e.g., the user device 160 shown and described with reference to FIG. 1) More particularly, the method can be implemented as code stored within a memory (e.g., the memory 164) of the user device and executed on a processor (e.g., the processor 162).

FIG. 4A depicts aspects of mobile conversion attribution associated with an advertisement tag. At 607, an advertisement containing an advertisement tag can be received, which can be similar to the user device 260 receiving signal 307. The advertisement tag can include a first segment identifier. When the advertisement is received, the advertisement tag can fire (e.g., automatically execute on the processor of the user device), for example as described in reference to 218 of FIG. 2, causing the user device to send a signal, at 609, containing the first segment identifier, the time the advertisement tag fired, and/or information about the user device, such as the IP address and/or UA. The signal sent, at 609, can be similar to signal 309, and can be sent to a conversion tracking server. As described above with reference to FIGS. 2 and 3A, the conversion tracking server can be operable to define a convertible identifier in response to receiving the signal sent, at 609.

FIG. 4B depicts aspects of mobile conversion attribution associated with a conversion tag. At 611, a purchase can be made and/or a website can be visited. For example, as described above with reference to FIG. 1, the user device 160 can send a signal to a merchant server 130, which can include a first segment identifier. When the conversion tag is received, the conversion tag can fire (e.g., automatically execute on the processor of the user device), for example as described in reference to 219 of FIG. 2, causing the user device, at 619, to send a signal containing the second segment identifier, the time the conversion tag fired, and/or information about the user device, such as the IP address and/or UA. The signal sent, at 619, can be similar to signal 319, and can be sent to a conversion tracking server. As described above with reference to FIGS. 2 and 3A, the conversion tracking server can be operable to define a conversion identifier in response to receiving the signal sent, at 619. In response to sending the signal, at 619, the conversion tracking server can be operable to identify whether a conversion occurred and/or send a signal indicating if a conversion occurred, for example to an advertiser.

While various embodiments have been described above, it should be understood that they have been presented by way of example only, and not limitation. For example, while some embodiments describe conversion attribution by detecting an advertisement tag and a conversion tag firing on a single user device, in other embodiments, cross-device conversion events can be identified. For example, if a user uses a mobile device to view an advertisement and a traditional personal computer to complete a purchase, the systems, methods, and media described herein can be used to identify the conversion by, for example, associating the mobile device with the personal computer. For example, two user devices can be associated based on usage patterns and/or geosocial networks, as described in the commonly assigned U.S. patent application Ser. No. 13/492,569, filed Jun. 8, 2012, which is incorporated herein by reference in its entirety.

As another example, some embodiments described herein refer to an internet purchase as a conversion event. In another embodiment, a user device include a coupon management application that can be operable to capture a code, such as an image of a QR code, at a physical location of a merchant. In some embodiments, the code can include a conversion tag operable to fire when the code is captured, such that a conversion that occurs at a physical location can be identified. In yet other embodiments, the conversion event can include a pageview (e.g., associated with the merchant), a registration (e.g., of a subscription associated with the merchant and/or the product and/or service featured in the advertisement), a survey response, or any other suitable action an advertiser may desire a user to take after viewing an advertisement.

As yet another example, although some embodiments describe mobile devices, the systems, methods, and media disclosed herein can be used to identify advertising conversions for any type of device, such as such as a desktop computer, a laptop computer, a netbook, a tablet personal computer, an iPod®, an iPad®; a personal digital assistant; etc.

As another example, although some embodiments described an advertisement tag firing when an advertisement is viewed by a user device, in other embodiments, the advertisement tag can fire only when the user "clicks" or otherwise interacts with the advertisement. Furthermore, in some embodiments, both "view" events and "click" events can be tracked separately, such that a conversion tracking server can be operable to determine whether a "view" event or a "click" event was converted.

Where methods described above indicate certain events occurring in certain order, the ordering of certain events may be modified. Additionally, certain of the events may be performed repeatedly, concurrently in a parallel process when possible, as well as performed sequentially as described above. For example, although searching a convertible database for a matching segment identifier and determining whether an IP address and/or UA match are shown and described with reference to FIG. 3B, at 410 and 414, respectively, as occurring sequentially, in other embodiments, searching for a matching segment identifier and a matching IP address and/or UA can occur in parallel and/or in any order. Similarly, determining that an entry in a convertible database occurs within a predetermined period of time of an entry in a conversion database can occur in parallel with, or in any order with respect to identifying a matching segment identifier, UA, and/or IP address.

Although various embodiments have been described as having particular features and/or combinations of components, other embodiments are possible having a combination of any features and/or components from any of embodiments where appropriate as well as additional features and/or components. For example, although some embodiments described herein include two databases (e.g., the convertible database 105 and the conversion database 106, as shown and described with reference to FIG. 1), other embodiments can include only one database. For example, convertible identifiers and conversion identifiers can be stored in a single database (or any other number of databases).

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A method, comprising:
    receiving, at a first time and at a conversion tracking device, an indication of receipt of a conversion tag by a user device that includes a segment identifier and at least one of a user agent of the device or an Internet Protocol (IP) address of the user device, the indication of receipt of the conversion tag devoid of data stored by the user device in response to receiving an advertisement, the indication of receipt of the conversion tag received in response to the user device visiting a first website in which the conversion tag is embedded and executing code associated with the conversion tag;
    defining, using the conversion tracking device and based on receiving the indication of receipt of the conversion tag, a conversion identifier associated with the segment identifier and at least one of the user agent or the IP address;
    defining, using the conversion tracking device, a first database entry including an association between the first time and the conversion identifier;
    identifying, using the conversion tracking device, a second database entry including an advertisement identifier that matches the conversion identifier, the second database entry associated with an indication of receipt of an advertisement tag sent from the user device at a second time, the second time being within a predetermined period of time before the first time, the indication of receipt of the advertisement tag sent in response to the user device visiting a second website in which the advertising tag is embedded and executing code associated with the advertising tag; and
    defining, at the conversion tracking device, an association between the conversion identifier and the advertisement identifier indicating that the advertisement was successfully converted.

2. The method of claim 1 further comprising reporting, to an advertiser associated with the advertisement, that the advertisement was successfully converted.

3. The method of claim 1, wherein the segment identifier is a first segment identifier, the method further comprising:
    receiving, at the second time and from the user device, the indication of receipt of the advertisement tag including a second segment identifier and at least one of the user agent or the IP address;
    defining the advertisement identifier, the advertisement identifier associated with the second segment identifier and at least one of the user agent or the IP address; and
    defining, in the second database, an association between the second time and the advertisement identifier.

4. The method of claim 1, further comprising generating the conversion tag.

5. The method of claim 1, wherein the conversion identifier does not personally identify a user of the user device.

6. The method of claim 1, wherein defining the conversion identifier includes hashing, collectively, the user agent and the IP address.

7. The method of claim 1, wherein:
    the segment identifier is a first segment identifier, the user agent is a first user agent, and the IP address is a first IP address,
    the conversion identifier is a first hash of at least one of the first segment identifier, the first user agent, or the first IP address,
    the advertisement identifier is a second hash of at least one of a second segment identifier, a second user agent, or a second IP address, and
    the identifying includes matching the first hash with the second hash.

8. The method of claim 1, wherein identifying the advertisement identifier includes matching the segment identifier with a segment identifier of the advertisement identifier.

9. The method of claim 1, wherein the segment identifier is uniquely associated with a merchant.

10. The method of claim 1, wherein the segment identifier is uniquely associated with a product category.

11. The method of claim 1, wherein the segment identifier is uniquely associated with a product.

12. The method of claim 1, wherein the association between the conversion identifier and the advertisement identifier is an indication that a user of the user device completed a conversion action.

13. The method of claim 1, wherein:
    the advertisement is associated with the segment identifier; and
    the second database entry is an indication that the user device received the advertisement.

14. The method of claim 1, wherein the predetermined period of time is 24 hours.

15. The method of claim 1, wherein the conversion tag is embedded in a purchase confirmation website.

16. The method of claim 1, wherein the conversion identifier is not associated with a cookie.

17. The method of claim 1, wherein the segment identifier is a first segment identifier, the user agent is a first user agent, and the IP address of the user device is a first IP address, and identifying the second database entry includes matching the first segment identifier, the first user agent, and the first IP address with a second segment identifier, a second user agent, and an a second IP address associated with the second database entry.

18. The method of claim 17, wherein:

the conversion identifier is a first hash of the first segment identifier and at least one of the first user agent or the first IP address, the advertisement identifier is a second hash of the second segment identifier and at least one of the second user agent or the second IP address, and the identifying includes matching the first hash with the second hash.

* * * * *